Figure 1:
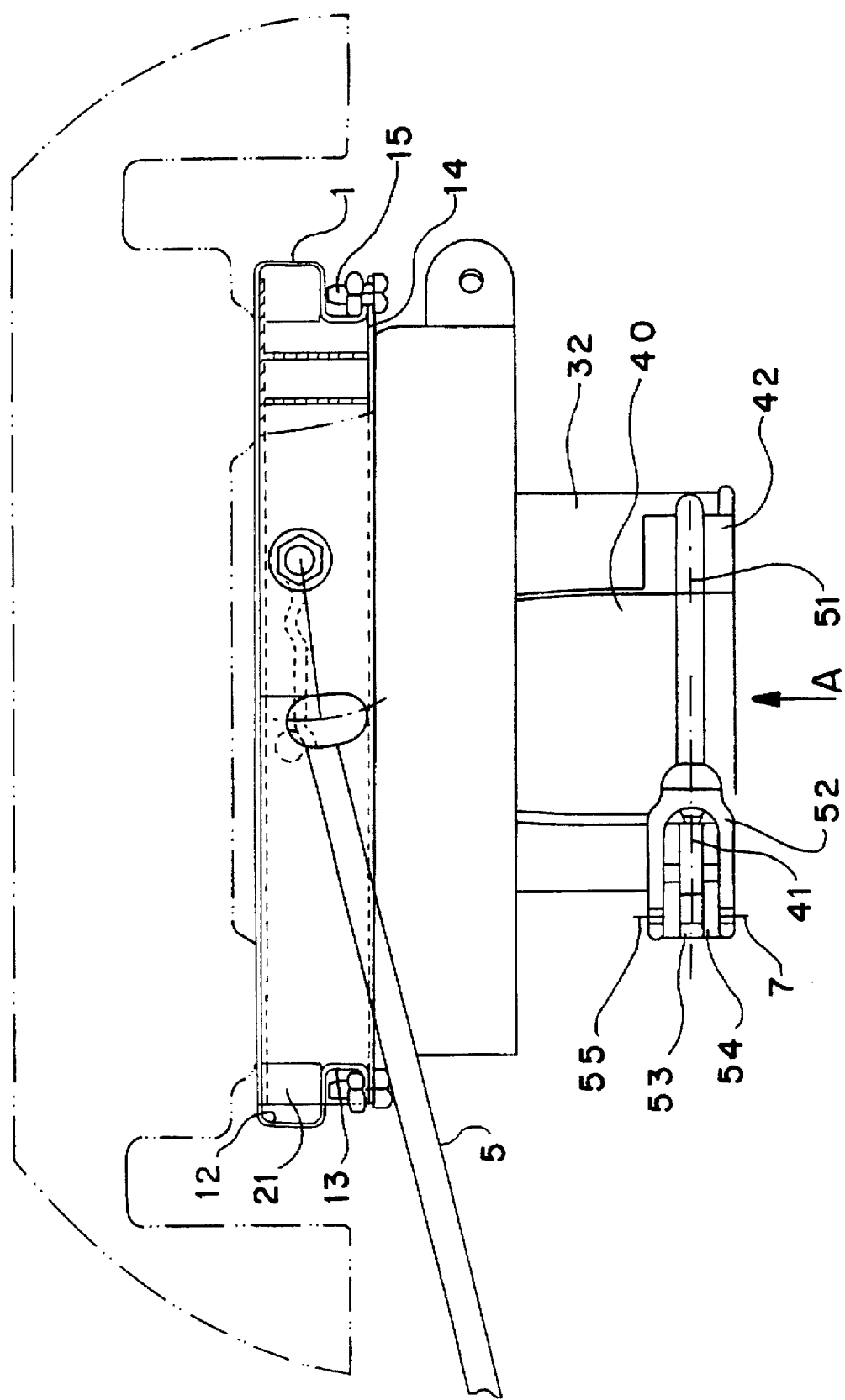
Figure 2:
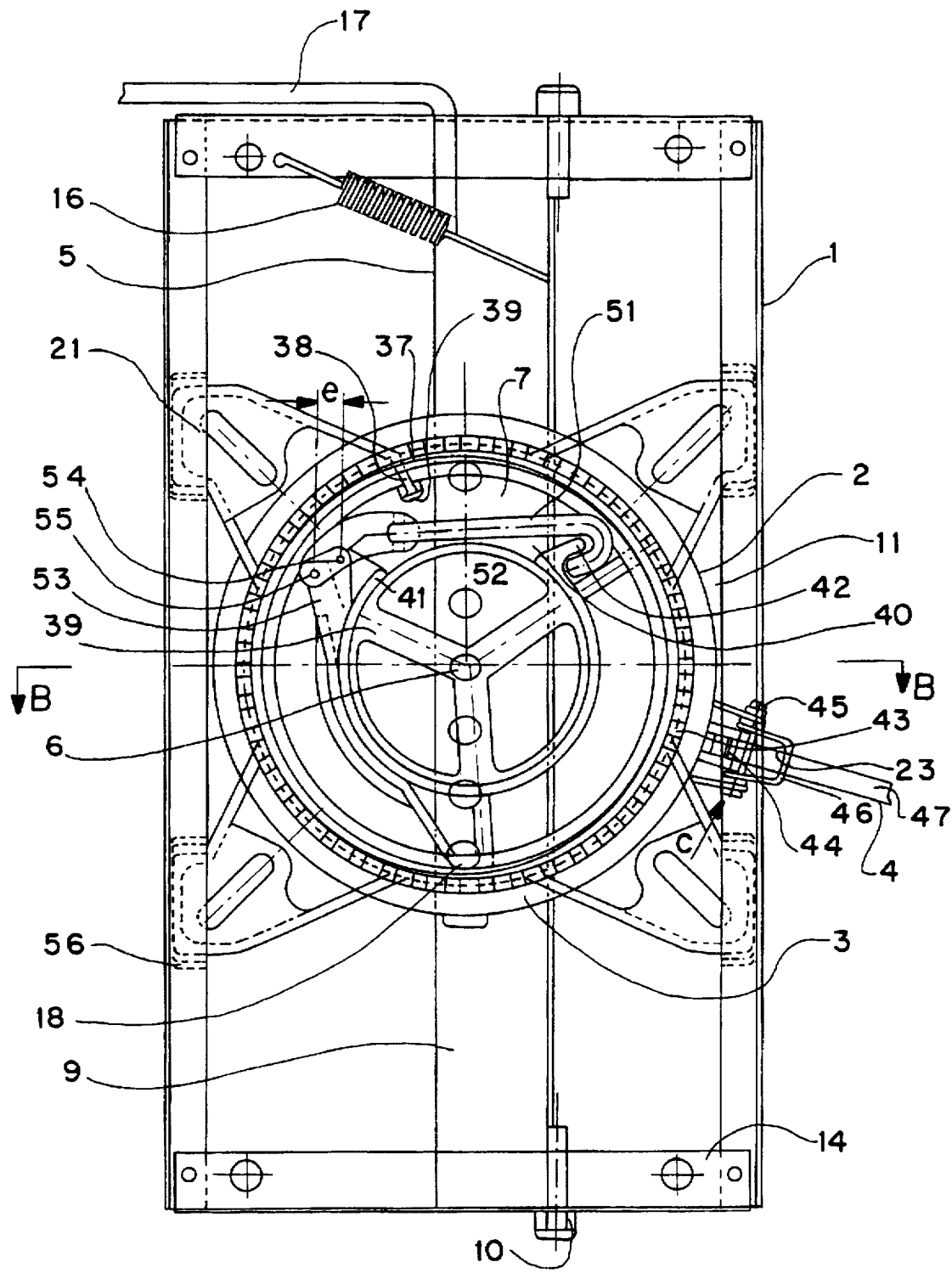
Figure 3:
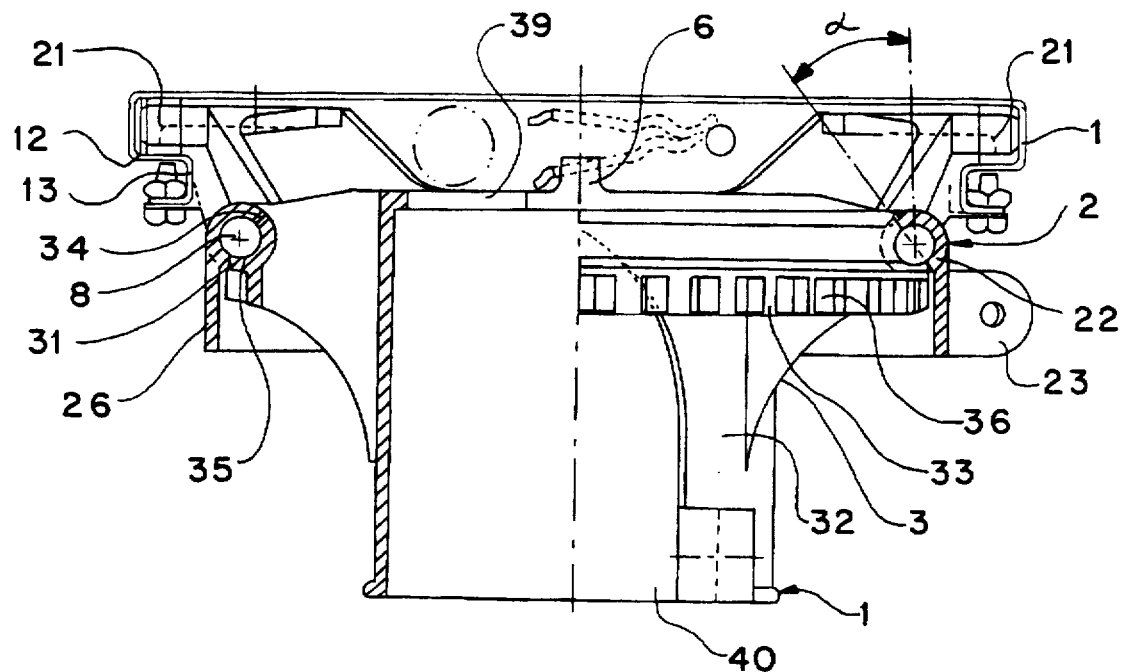
Figure 4:
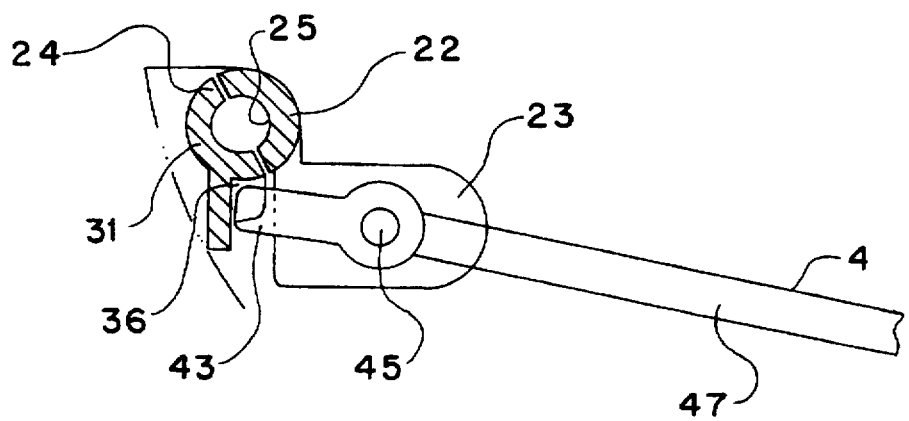

United States Patent [19]
Carnahan et al.

[11] Patent Number: 5,702,084
[45] Date of Patent: Dec. 30, 1997

[54] HI TEC SWIVEL AND SLIDE

[76] Inventors: Garnett Carnahan; Caroline Carnahan, both of Rte. 3, Box 18, Nixa, Mo. 65714

[21] Appl. No.: 388,833

[22] Filed: Feb. 15, 1995

[51] Int. Cl.⁶ .................................................. F16M 13/00
[52] U.S. Cl. .................. 248/416; 248/415; 248/425; 248/429; 297/344.24; 297/344.26
[58] Field of Search .................. 248/349.1, 415, 248/416, 419, 425, 429; 297/344.22, 344.24, 344.26

[56] References Cited

U.S. PATENT DOCUMENTS

| | | | |
|---|---|---|---|
| 2,645,272 | 7/1953 | Caramelli | 248/416 |
| 2,673,592 | 3/1954 | Caramelli | 248/416 |
| 3,009,739 | 11/1961 | Hamilton | 297/344.26 |
| 3,659,895 | 5/1972 | Dresden | 248/416 X |
| 4,014,507 | 3/1977 | Swenson | 248/416 X |
| 4,733,845 | 3/1988 | Maiwald | 248/429 |
| 5,082,328 | 1/1992 | Garelick | 297/344.26 X |
| 5,482,354 | 1/1996 | Gryp | 297/344.22 |

FOREIGN PATENT DOCUMENTS 1098486  2/1995  China.

*Primary Examiner*—Alvin C. Chin-Shue
*Assistant Examiner*—Richard M. Smith
*Attorney, Agent, or Firm*—Beveridge, DeGrandi, Weilacher & Young, LLP

[57] ABSTRACT

A kind of SWIVEL AND SLIDE assembly including a Slide Base, Swivel Part, Slide Part, Lock Part, and Channels at both sides of the Slide Base. The Swivel Part includes a first Swivel Base and a second Swivel Base. The first Swivel Base includes the Slide Feet extending into the Channel, the female circle of the Ring Part, the Lunar Groove and the Pedestal. The second Swivel Base includes the male circle of the Ring Part, the Lunar Groove and the Swivel Lock Slots. Overlapping of the male circle and female circle is fixed by the rolling balls. By installing a Lock matched with the Lock Slot the swiveling can be started or stopped. This invention provides well distributed pressure when swiveling, easy operation, and reliable lock.

13 Claims, 3 Drawing Sheets

HI TEC SWIVEL AND SLIDE

DESCRIPTION

This invention is a Swivel and Slide device applicable foe Tables, Chairs, and instruments. The definition being, an installation with a reliable locking function for both rotation and forward-back sliding of tables and chairs.

So far, Swivel and Slide devices are installed separately on the turning and the sliding part of the device. If necessary, the two separate features can be put together on one chair and table. However, the Swivel device turns by installing a casing pipe or a shaft-revolving bearing piece. The forward-back Slide is designed as a screw bar, screw nut, and thread piece assembly and protrudes in order to realize relative displacement and locks by friction. Though the above described conventional devices are relatively simple, their operation is difficult. For example, strenuous, low speed, bad stability and low reliability when in a locking mode are characteristics of the prior art.

The goal of this invention is to compensate for the disadvantages currently seen in Swivel and Slide technology by finding a way to conveniently and reliably turn and lock tables and chairs by setting one upper Swivel part onto a lower swivel part, and providing each with a bearing groove and, both the upper and underneath Swivel part support swivel lock assembly and sliding lock assembly components.

The dual endeavor of this invention is to make the Swivel part both the pivot point for turning and the forward-back slide locking point.

In order to achieve the above-mentioned aims, the Swivel and Slide device is inclusive of the SLIDE BASE, SWIVEL PART, SLIDE PART, and LOCK PART.

The SLIDE BASE consists of two bent slide channels extending in the longitudinal direction on both sides of the base, fixing the base sheet, and two side plates positioned perpendicular to the slide channels.

The aforementioned Swivel Base Assembly includes Swivel Base 1 and Swivel Base 2. Said Swivel Base 1 consists of four slide feet above, and the first ring underneath extending from the feet, and the lock holder provided on the outside surface of the first ring. The said first ring consists of the female circle tapered to the center line of the Swivel Base 1 from bottom to top and the lunar groove on the female circle.

The said Swivel Base 2 consists of the second ring above, the shell positioned under the ring and extending from the ring, and the circular ribs which join the ring with the shell. The second ring consists of the male circle which tapers to the center line of the Swivel Base 2 from the bottom to top and the lunar groove on the male circle. Furthermore, on Swivel Base 1 there is a screw hole which penetrates through the wall of the first ring into the female circle aiming at the center line of the Swivel Base. Four or greater than four swivel slots are evenly spread on the circular wall of said Swivel Base 2. There is the notch on the said shell, and on both sides of the shell near the notch is fixed the Tube Base and the Tube Lock Hook for the Tube Lock.

While assembling Swivel Base 1 with Swivel Base 2, the said female circle of the first ring will match with the male circle of the second ring. The two lunar grooves, when combined, form an integrated circular space. Rolling balls can be put in this space. And the screw hole on Swivel Base 1 can be sealed by a greaser.

After assembling Swivel Base 1 with Swivel Base 2, the four feet of Swivel Base 1 will be inserted into the inside channel of Slide Base 2.

The said Lock Part consists of one pivot, one lock which stands on a pivoting shaft and projects its tongue into the slots of Swivel Base 2, and a spring whose one end props one tip of the lock and the other end props the clamping part of a taper hole on the first ring of Swivel Base 1.

The said female circle and male circle on Swivel Base 1 and Swivel Base 2 present a slant angle from 0–45 degrees relative to the perpendicular center line.

This invention takes the particular design of Swivel Base 1 and Swivel Base 2 that lets the rolling balls be located in the circular space formed by the two lunar circles combination, and applies a locking operation to the relative turning between two swivels by setting the insert lock and slots on the Swivels respectively. Therefore this structure provides (1) adequate distribution of applied force when turning, (2) simple operation when locking, (3) and effort-sparing, stable and reliable performance.

Following is a detailed illustration for the best embodiment of this invention with reference to the attached drawings.

DRAWING 1 is the assembly drawing of the invention.

DRAWING 2 is a bottom view of Drawing 1.

DRAWING 3 is the sectional view along cross-section line III—III of Drawing 2.

DRAWING 4 is a close up view of the lock part of Drawing 2.

To refer to Drawing 1–3, the invention includes Slide Base (1), first Swivel Base (2), second Swivel Base (3), Lock Part (4), Slide Lock (5), Tube Lock (7). Said Slide Base (1) consists of one sheet (11), the bent inside channels (12) in longitudinal direction on both sides of the sheet, plus two outside channels if better conditions are available, and two side plates (14) perpendicular to longitudinal direction respectively fixed on the two ends of the sheet. The said side plates (14) are fixed onto the sheet (11) by bolts (15). However, sheet (11) is generally used as an installation face connected with the bottom of chairs and tables (indicated by dotted line) by means of the holes in it.

Said first Swivel Base (2) consists of a single first ring (22) under the slide feet (21) and extending from slide feet (21), and one lock holder on the outside surface of the ring. The surface forming line of the female circle of the said first ring (22), intersects either the female taper surface (24) crossed by the center line of the Swivel Base (2) or the first Lunar groove (25) on the taper face. The said female circle presents the slant angle from 0–45 degrees relative to the center line or available, circle wall (26) positioned under the first ring (22).

Said Second Swivel Base (3) includes the second ring (31) above, the shell (32) under the second ring and extended from the second ring, and the circular wall (33) under second ring (31) and in front of the shell (32). The surface forming line of the male circle of said second ring (31) intersects either the male taper surface (34) crossed by the center line of Swivel Base 2 or the second lunar groove (35) on the taper face. The said male circle (34) presents a slant angle from 0–45 degrees relative to the center line or perpendicular line. In addition, there are the Swivel slots (36) on the circular wall (33). The quantity of the Swivel slots can be designed according to requirements of the user. In general, four slots or greater than four slots are used. For instance, if applied to household chairs and tables whose angle control calls for no strictness the swivel slots are usually 10–50 in number; when used for chairs and tables of transportation means, the swivel slots are usually more, perhaps 30–80, however 30–60 slots is optimum. On first Swivel Base (2) there is a screw hole (37) which penetrates through the wall of the first ring (22) into the female circle aiming at the center line of the Swivel Base. Inside the hole (37) is tapped a thread. There is a notch (40) on the shell and on both sides of the shell near the notch is fixed Tube Base (41) and Tube Lock Hook (42). There is a Tube Lock Screw (7) between Tube Base (41) and Tube Lock Hook (42) so as to fix the device under chairs and tables.

While installing first Swivel Base (2) onto second Swivel Base (3), the female circle (24) of the first ring of the said Swivel Base (2) will join closely with the male circle (34) of the second ring of the said Swivel Base (3). The first lunar groove (25) and the second lunar groove will be closed into a circular space. Some of the balls (8) can be put into the circular space through the hole (37) on the first ring. Meanwhile, the hole (37) can be also used as a passageway for injecting ball grease. To this end, in general, this hole will be sealed off with the bolt (39). After the balls are put into the circular space made of first lunar groove (25) and the second lunar groove (35), first Swivel Base (2) and second Swivel Base (3) are positioned by the balls (8) to facilitate relative turning. In addition, the turning is very smooth and steady because the balls' groove has an oblique face which makes for improved strength as forces are directed to the center of the assembly along lines lying flush with the oblique face.

Lock part (4) includes Swivel Lock Handle (47) the spring (46) and the pivot (45). Swivel Lock Handle is a stick, the front end has the lock tongue (43) that can be blocked into the swivel slots (36) of second Swivel Base (3) and the remaining part is the handle. There the pivot hole which is (44) located on the handle part behind the lock tongue. Said Swivel Handle is fixed on the stand (23) of first Swivel Base (2) by the pivot (45). The ring spring part formed in the middle of spring (46) is fixed on the pivot (45), the projecting part in front is pressing on the Lock handle, and the rear legs are fixed under the stand (23) as the free end. In application, users will raise Lock Handle by hand to let the lock tongue of Lock Handle withdraw from the slide slot. At this moment, the lock effect is canceled and the device can be operated to turn for direction option in any desired radial position. After a desirous angle is reached, the operator loosens or lets go Lock Handle 47 at a selected position to allow the Lock Tongue to automatically spring back into the desired slot. At this point, the swivel part or seating platform is locked with the pedestal.

Pivot Pin (6) is located at center of radial ribs (39) on the inside surface of the Second Ring (31) of second Swivel Base (3). A rotatable Lock Plate Package is provided that is designed to receive Pivot Pin (6) and has a slide and lock member with ends positioned on two Side Plates of the Slide Base (1). Thus, the Lock Plate Package consists of the Lock Plate (9), one or two shafts (10) that is welded on the side end of the Lock Plate as a Pivot, the Spring (16) whose one end is fixed on one side of the shaft (10) of the Lock plate and the other end is fixed on the Side Plate (14) of Slide Base, and L-shaped Handle (17) that is fixed on the one end of the Lock Plate and extends out away from Slide Base (1). In order to control the rotating angle of the Lock Plate (9), the bar of the handle (17) is extended outside from Side Plate (14). There is provided a straight series of greater than two holes (18) which direction is parallel with movement of the Lock Plate (9) with respect to Pivot Pin (6). The Lock Plate (9) is fixed onto the Side Plate (14) by the shaft (10) that is welded to the Lock Plate. This allows the users to raise the handle (17) to lift lock plate (9) a certain degree by overcoming elasticity of the Spring (16) in order to avoid the Pivot Pin (6) of the Swivel Part and move slide base (1) forward and back if the slide base (1) or the Seating Platform mounted on the slide base needs to be moved forward or back. When movement has been completed and the user desires to stop, the user simply lets go the handle to get the Lock Plate to touch the Pivot Pin under action of the Spring (16) and let the Pivot Pin become trapped into one of the holes (18) to secure a locked position. The number of holes on the Lock Plate is preferably 5–20. Moreover, the Slide distance of the Lock Plate to the Pivot Pin will be within 300 mm.

Said Lock Part (7) includes Tube Lock Screw (51) whose front part is hook shaped and the rear part is threaded, Tube Lock Screw Nut (52) whose rear part has the fixture hole and Tube Lock Handle (53) with two eccentric holes. Said Lock Handle (53) is fixed on Tube Base (41) by the Pivot (55). Said Tube Lock Nut (52) is fixed onto the Tube Lock Handle (53) by the Pivot (55). Said Tube Lock Screw (51) is adjustable by connecting its front part with Tube Hook (42) on the shell by its hook-shaped part. On Drawing 1, Tube Lock Handle is closed. This means that the device can be locked tightly with chairs and tables being fixed in position by the Lock Part. On the contrary, pull Tube Lock Handle (53), if there is a need to dismantle the device from the chair or table, can be easily released. At this moment, the Tube Lock Handle turning around the Pivot in Tube Base pushes Tube Lock Screw Nut following the locus of the Pivot (55) thereby to get Tube Lock Screw (51) over the hook on the shell to separate the shell from the chair or table upon opening. The eccentric distance between two holes on the over-the-center Tube Lock Handle is e=0.5–10 mm. In the above mentioned arrangement, the purpose of connecting the adjustable Tube Lock Screw and the Tube Lock Nut is to regulate the degree of tightness in order to accommodate different pedestal diameters when closing the lock.

In addition, in order to reduce friction when the Slide Base is sliding along its channels with respect to the Swivel Base during use, the bushing (56) is usually applied to the Slide feet. The bushing is made of plastic material and generally its structure is provided with a characteristic of elasticity as much as possible in order to improve the light sense when sliding.

What is claimed is:

1. A swivel and slide assembly, comprising:

a slide base that includes a first longitudinal sliding component;

a first swivel base that includes a second longitudinal sliding component which is dimensioned to provide, in conjunction with said first longitudinal sliding component, guided longitudinal sliding between said first swivel base and slide base; and a second swivel base positioned radially inward of said first swivel base, said second swivel base having a first bearing reception ring which defines one portion of a bearing reception cavity, said first bearing reception ring having a first confronting face which is angled radially outward with respect to a section of an axial center line of said first swivel base extending through said slide base, and said first swivel base having a second bearing reception ring which defines another portion of a bearing reception cavity and which includes a second confronting face which is angled in a corresponding manner as said first confronting face such that loads on said slide base and swivel bases are directed radially inward toward the axial center line of said first swivel base; and a first locking mechanism supported by said slide base, and positioned so as to engage said second swivel base when in a locking state.

2. An assembly as recited in claim 1 further comprising a plurality of spherical bearings extending partially within each of said reception rings, and a second locking mechanism for preventing relative rotation between said first and second swivel bases.

3. An assembly as recited in claim 1 wherein said first locking mechanism comprises a lock plate which is pivotably supported on said slide base and pivots about an axis extending longitudinally in a slide direction of said slide base, said lock plate including a series of holes spaced along the longitudinal direction, and said second swivel base including a centrally positioned pivot post, and said swivel and slide assembly further comprising a handle connected to said lock plate and positioned for conveying a rotation motion in said lock plate upon handle repositioning such that said lock plate is able to assume a free slide position and a slide lock position, and said pivot post extends through one of said holes in said lock plate when said lock plate is in said slide lock position and said lock plate is clear of said pivot post when in the free slide position.

4. An assembly as recited in claim 3 further comprising a biasing member which biases said lock plate into the slide lock position.

5. An assembly as recited in claim 3 wherein said second swivel base includes a plurality of spoke-like ribs which extend radially outward from said pivot post and are connected to a cylindrical wall of said second swivel base such that the ribs support said pivot post.

6. An assembly as recited in claim 1 wherein said slide base includes a pair of laterally spaced slide channels and said first swivel base includes a plurality of slide feet slidingly received in said slide grooves and said first swivel base including a circumferential wall joined with the second bearing reception ring, said circumferential wall including a lock holder said second swivel base including a series of circumferentially spaced reception slots, and said assembly including a swivel lock handle supported by said lock holder and having a tongue dimensioned for insertion in a corresponding one of said reception.

7. An assembly as recited in claim 6 further comprising a coil spring biasing said tongue into one of said reception slots.

8. An assembly as recited in claim 1 wherein said second swivel base includes a generally cylindrical shell with a notch formed in one side thereof, and said shell including a flanged extension at one edge of said notch and said second swivel base further including a base member extending off said shell adjacent an opposite edge of said notch, and said assembly further comprising a tube lock screw having a first hooked end designed for engagement with said flanged extension and a threaded opposite end secured to an adjustment member which is pivotably supported on said base member at a first pivot location, and said assembly further comprising a tube handle pivotably secured to said base member at said first pivot location and also pivotably secured to said adjustment member at a second pivot location with the two pivot locations being in an off-center relationship to provide an over the center locking arrangement.

9. A swivel and slide assembly, comprising:

a slide base that includes a first longitudinal sliding section;

a first swivel base that includes a second longitudinal sliding section which is dimensioned to provide, in conjunction with said first longitudinal sliding section, guided longitudinal sliding between said first swivel base and slide base; and a second swivel base positioned radially inward of said first swivel base, and said assembly further comprising a lock plate which is supported on said slide base, said lock plate including a series of holes spaced along the longitudinal direction, and said second swivel base including a centrally positioned pivot post, and said assembly further comprising a handle in mechanical communication with said lock plate and positioned for conveying a motion in said lock plate upon handle repositioning such that said lock plate is able to assume a free slide position and a slide lock position, and said pivot post extends through one of said holes in said lock plate when said lock plate is in said slide lock position and said lock plate is clear of said pivot post when in the free slide position.

10. An assembly as recited in claim 9 wherein said lock plate is pivotably supported on said slide base and, upon manipulation of such handle, said motion imparted is a rotation motion whereupon said pivot post extends through one of said series of holes.

11. A swivel and slide assembly, comprising:

a slide base that includes a first longitudinal sliding section;

a first swivel base that includes a second longitudinal sliding section which is dimensioned to provide, in conjunction with said first longitudinal sliding section, guided longitudinal sliding between said first swivel base and slide base; and a second swivel base positioned radially inward of said first swivel base, wherein said second swivel base includes a generally cylindrical shell with a notch formed in one side thereof, and said shell including a flanged extension at one edge of said notch and said second swivel base further including a base member extending off said shell adjacent an opposite edge of said notch, and said assembly further comprising a tube lock screw having a first hooked end designed for engagement with said flanged extension and a threaded opposite end secured to an adjustment member which is pivotably supported on said base member at a first pivot location, and said assembly further comprising a tube handle pivotably secured to said base member at said first pivot location and also pivotably secured to said adjustment member at a second pivot location with the two pivot locations being in an off-center relationship to provide an over the center locking arrangement.

12. A swivel and side assembly, comprising:

a slide base that includes a first longitudinal sliding component;

a first swivel base that includes a second longitudinal sliding component which is dimensioned to provide, in conjunction with said first longitudinal sliding component, guided longitudinal sliding between said first swivel base and slide base;

a second swivel base which supports said first swivel base such that said first swivel base is free to rotate with respect to said second swivel base, a first locking mechanism for locking said first and second swivel bases to preclude relative rotation therebetween;

a second locking mechanism supported by said slide base for preventing relative sliding action between said slide base and second swivel base and said second swivel base including, at a central position thereof, a central pivot post which provides both a central pivot location with respect to said first swivel base and a catch for said second locking mechanism.

13. An assembly as recited in claim 12 wherein said central pivot post extends through a central hole provided in said first swivel base and said second locking mechanism is an elongated plate with a series of spaced apertures provided therein, and said spaced apertures being sized so as to receive said pivot post when said second locking mechanism is in a locking state.

* * * * *